(12) United States Patent
Chuang et al.

(10) Patent No.: US 11,445,176 B2
(45) Date of Patent: Sep. 13, 2022

(54) METHOD AND APPARATUS OF SCALING WINDOW CONSTRAINT FOR WORST CASE BANDWIDTH CONSIDERATION FOR REFERENCE PICTURE RESAMPLING IN VIDEO CODING

(71) Applicant: MEDIATEK INC., Hsinchu (TW)

(72) Inventors: Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/117,757

(22) Filed: Dec. 10, 2020

(65) Prior Publication Data
US 2021/0218956 A1    Jul. 15, 2021

Related U.S. Application Data

(60) Provisional application No. 62/960,782, filed on Jan. 14, 2020.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/186* (2014.11); *H04N 19/70* (2014.11)

(58) Field of Classification Search
CPC .... H04N 19/70; H04N 19/132; H04N 19/105; H04N 19/176; H04N 19/186
See application file for complete search history.

(56) References Cited

U.S. PATENT DOCUMENTS

| 9,319,729 B2 | 4/2016 | Sullivan |
| 9,998,735 B2 | 6/2018 | Chen et al. |

(Continued)

FOREIGN PATENT DOCUMENTS

| CN | 101366281 A | 2/2009 |
| CN | 103718551 A | 4/2014 |
| CN | 105103560 A | 11/2015 |

OTHER PUBLICATIONS

International Search Report and Written Opinion dated Mar. 10, 2021, issued in application No. PCT/CN2020/135817.

(Continued)

*Primary Examiner* — Neil R Mikeska
(74) *Attorney, Agent, or Firm* — McClure, Qualey & Rodack, LLP (57) ABSTRACT

Method and apparatus of coding a video sequence are disclosed, wherein Reference Picture Resampling (RPR) mode is included as a coding tool. According to the method, a bitstream corresponding to encoded data of the video sequence is generated or received, where the bitstream includes one or more syntaxes related to the RPR mode when the RPR mode is enabled, and scaling information for the RPR mode is derived using first information including said one or more syntaxes, and wherein said one or more syntaxes are constrained by taking into account a value corresponding to Max(8, (minimum coding block size for a luma component)). A target picture of the video sequence is encoded or decoded utilizing the scaling information when the RPR mode is enabled for the target picture.

12 Claims, 2 Drawing Sheets

(51) Int. Cl.
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 2010/0150231 A1 | 6/2010 | Huang et al. | |
| 2013/0002907 A1 | 1/2013 | Alvarez et al. | |
| 2014/0092978 A1* | 4/2014 | Bugdayci | H04N 19/30 375/240.16 |
| 2014/0133580 A1 | 5/2014 | Chang et al. | |
| 2014/0301463 A1* | 10/2014 | Rusanovskyy | H04N 19/39 375/240.14 |
| 2014/0341275 A1 | 11/2014 | Chen et al. | |
| 2015/0071356 A1* | 3/2015 | Kim | H04N 19/187 375/240.16 |
| 2015/0195573 A1 | 7/2015 | Aflaki Beni et al. | |
| 2015/0341604 A1* | 11/2015 | Cote | H04N 5/365 348/242 |
| 2016/0165247 A1* | 6/2016 | Deshpande | H04N 19/136 375/240.08 |
| 2016/0191931 A1 | 6/2016 | Hannuksela | |
| 2016/0337651 A1* | 11/2016 | Alshina | H04N 19/182 |
| 2017/0085917 A1 | 3/2017 | Hannuksela | |
| 2018/0270480 A1* | 9/2018 | Zhang | H04N 19/86 |
| 2018/0278940 A1* | 9/2018 | Park | H04N 19/136 |
| 2019/0104322 A1* | 4/2019 | Tsukuba | H04N 19/157 |
| 2019/0200021 A1* | 6/2019 | Park | H04N 19/132 |
| 2019/0208203 A1* | 7/2019 | Tsukuba | H04N 19/147 |
| 2019/0349598 A1 | 11/2019 | Aminlou et al. | |

OTHER PUBLICATIONS

Hsiang, S.T., et al.; "AHG9/AHG12: Modifications related to subpicture signalling and RPR;" Joint Video Experts Team (JVET) of ITU-T SG 16 WP 3 and ISO/IEC JTC 1/SC 29/WG 11; Jan. 2020; pp. 1-5.
Hendry, et al.; "AHG8: Support for reference picture resampling—handling of picture size signalling, conformance windows, and DPB management;" Joint Video Experts Team (JVET) Jof ITU-T SG 16 WP 3 and ISO/IEC JTC 1/SC 29/WG 11; Jul. 2019; pp. 1-3.
Choi, B., et al.; "AHG8: Signaling and Filtering for Reference Picture Resampling;" Joint Video Experts Team (JVET) of ITU-T SG 16 WP 3 and ISO/IEC JTC 1/SC 29/WG 11; Jul. 2019; pp. 1-8.
Vadim, S., et al.; "AHG8: Scaling window for scaling ratio derivation;" Joint Video Experts Team (JVET) of ITU-T SG 16 WP 3 and ISO/IEC JTC 1/SC 29/WG 11; Oct. 2019; pp. 1-5.
Non-Final Office Action dated Jan. 21, 2022, issued in U.S. Appl. No. 17/117,724.

* cited by examiner

METHOD AND APPARATUS OF SCALING WINDOW CONSTRAINT FOR WORST CASE BANDWIDTH CONSIDERATION FOR REFERENCE PICTURE RESAMPLING IN VIDEO CODING

CROSS REFERENCE TO RELATED APPLICATIONS

The present invention claims priority to U.S. Provisional Patent Application, Ser. No. 62/960,782, filed on Jan. 14, 2020. The U.S. Provisional Patent Application is hereby incorporated by reference in its entirety.

FIELD OF THE INVENTION

The present invention relates to video coding incorporating Reference Picture Resampling (RPR) coding tool. In particular, the present invention relates to constraining RPR parameters to alleviate the worst-case memory bandwidth.

BACKGROUND AND RELATED ART

The High Efficiency Video Coding (HEVC) standard has been developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). The emerging video coding standard development, named Versatile Video Coding (VVC), has taken place in recent year as a next generation video coding beyond HEVC. VVC supports Reference Picture Resampling (RPR) as a tool for adaptive streaming services to support on-the-fly upsampling and downsampling motion compensation. Techniques related to adaptive streaming services are reviewed as follows.

Reference Picture Resampling (RPR)

Figure 1:
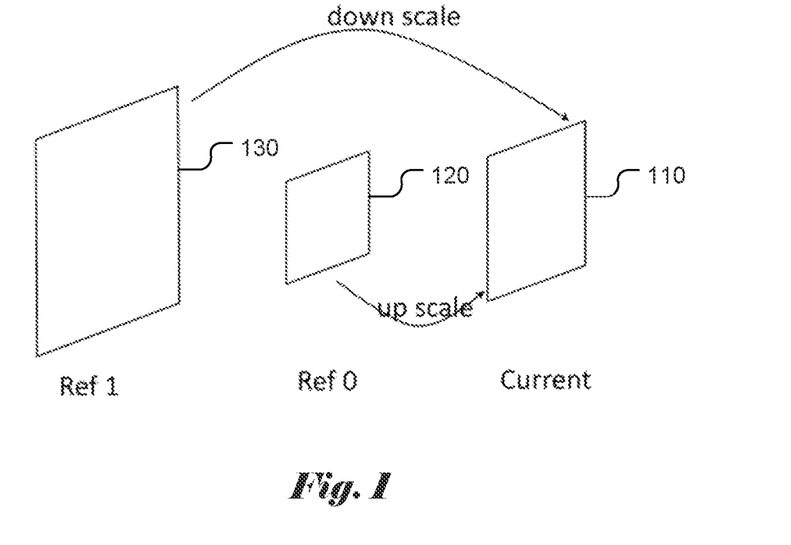
FIG. 1 illustrates a hypothetical example of Adaptive Resolution Change (ARC) with Reference Picture Resampling (RPR), where a current picture is predicted from reference pictures (Ref0 and Ref1) of different sizes.

During the development of VVC, according to "Requirements for a Future Video Coding Standard", "the standard shall support fast representation switching in the case of adaptive streaming services that offer multiple representations of the same content, each having different properties (e.g. spatial resolution or sample bit-depth)." In real-time video communication, allowing resolution change within a coded video sequence without inserting an I picture can not only adapt the video data to dynamic channel conditions or user preference seamlessly, but also remove the beating effect caused by I pictures. A hypothetical example of Adaptive Resolution Change (ARC) with Reference Picture Resampling (RPR) is shown in FIG. 1, where the current picture (110) is predicted from reference pictures (Ref0 120 and Ref1 130) of different sizes. As shown in FIG. 1, reference picture Ref0 (120) has lower resolution than the current picture (110). In order to use reference picture Ref0 as a reference, Ref0 has to be up-scaled to the same resolution as the current picture. Reference picture Ref1 (130) has higher resolution than the current picture (110). In order to use reference picture Ref1 as a reference, Ref1 has to be down-scaled to the same resolution as the current picture.

To support the spatial scalability, the picture size of the reference picture can be different from the current picture, which is useful for streaming applications. Methods for supporting Reference Picture Resampling (RPR), which is also referred as Adaptive Resolution Change (ARC), has been studied for inclusion into VVC specification. At the 14th WET meeting in Geneva, several contributions on RPR were submitted for discussion during the meeting.

When RPR is used, a picture size ratio is derived from the reference picture width and height and the current picture width and height. The picture size ratio is constrained to be within a range of [⅛ to 2]. In other words, the picture size ratio is between ⅛ and 2 inclusive. The picture width/height in luma samples can be signaled in the bitstream, such as PPS, and the semantics are shown as follow.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_in_luma_samples.

When subpics_present_flag is equal to 1 or ref_pic_resampling_enabled_flag equal to 0, the value of pic_width_in_luma_samples shall be equal to pic_width_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1 or ref_pic_resampling_enabled_flag equal to 0, the value of pic_height_in_luma_samples shall be equal to pic_height_max_in_luma_samples.

When the picture size of the current picture and reference pictures are specified, the following constraint shall be satisfied. This constraint limits the picture size ratio of the reference picture to the current picture to be within the range of [⅛, 2].

Let refPicWidthInLumaSamples and refPicHeightInLumaSamples be the pic_width_in_luma_samples and pic_height_in_luma_samples, respectively, of a reference picture of a current picture referring to this PPS. It is a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

In VVC, a scaling ratio and scaling offsets for RPR are derived from the syntax information signaled in PPS. The PPS syntaxes are shown in the following table.

TABLE 1

Picture parameter set RBSP syntax for scaling ratio and scaling offsets

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |

TABLE 1-continued

Picture parameter set RBSP syntax for
scaling ratio and scaling offsets

| | Descriptor |
|---|---|
| conf_win_top_offset | ue(v) |
| conf_win_bottom_offset | ue(v) |
| } | |
| scaling_window_flag | u(1) |
| if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
| } | |
| ... | |

The semantic of the syntaxes are described as follows.

scaling_window_flag equal to 1 specifies that the scaling window offset parameters are present in the PPS. scaling_window_flag equal to 0 specifies that the scaling window offset parameters are not present in the PPS. When ref_pic_resampling_enabled_flag is equal to 0, the value of scaling_window_flag shall be equal to 0.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidth$L$=pic_width_in_luma_samples−(scaling_win_right_offset+scaling_win_left_offset).

PicOutputHeight$L$=pic_height_in_luma_samples−(scaling_win_bottom_offset+scaling_win_top_offset).

fRefWidth is set equal to PicOutputWidthL of the reference picture RefPicList[i][j] in luma samples and fRefHeight is set equal to PicOutputHeightL of the reference picture RefPicList[i][j] in luma samples.

RefPicScale[$i$][$j$][0]=((fRefWidth<<14)+(PicOutputWidth$L$>>1))/PicOutputWidth$L$ RefPicScale[$i$][$j$][1]=((fRefHeight<<14)+(PicOutputHeight$L$>>1))/PicOutputHeight$L$.

RefPicIsScaled[$i$][$j$]=(RefPicScale[$i$][$j$][0] !=(1<<14)) ||(RefPicScale[$i$][$j$][1] !=(1<<14)).

While RPR adds flexibility to the coded video bitstream, the motion compensation associated with the scaling of RPR causes increase in computation complexity as well as memory bandwidth. In order to alleviate the worst case memory bandwidth, the present invention discloses methods and apparatus to constrain the parameters related to RPR.

BRIEF SUMMARY OF THE INVENTION

Method and apparatus of coding a video sequence to alleviate a worst case memory bandwidth increase associated with motion compensation, are disclosed, wherein a Reference Picture Resampling (RPR) mode is supported. According to the method, a bitstream corresponding to encoded data of the video sequence is generated at an encoder side or received at a decoder side, wherein the bitstream comprises one or more syntaxes related to the RPR mode when the RPR mode is enabled, and scaling information for the RPR mode is derived using first information comprising said one or more syntaxes, and wherein said one or more syntaxes are constrained by taking into account a value corresponding to Max(8, (minimum coding block size for a luma component)). A target picture of the video sequence is encoded, at the encoder side, or decoded at the decoder side, utilizing the scaling information when the RPR mode is enabled for the target picture. In one embodiment, the minimum coding block size for the luma component is indicated by syntax MinCbSizeY.

In one embodiment, the syntaxes comprise a first syntax corresponding to current picture width in luma samples and a second syntax corresponding to maximum picture width in the luma samples. In one embodiment, the syntaxes are constrained to cause ((the current picture width−Max(8, MinCbSizeY))*scaling window width of reference picture in the luma samples) to be smaller than or equal to (the maximum picture width*scaling window width of the current picture).

In one embodiment, the syntaxes comprise a first syntax corresponding to current picture height in luma samples and a second syntax corresponding to maximum picture height in the luma samples. In one embodiment, the syntaxes are constrained to cause ((the current picture height−Max(8, MinCbSizeY))*scaling window height of reference picture in the luma samples) to be smaller than or equal to (the maximum picture height*scaling window height of the current picture).

In one embodiment, the bitstream complies with a bitstream conformance requirement that said one or more syntaxes are constrained by disregarding the interpolation filter for the motion compensation, and said one or more syntaxes are constrained by taking into account the value corresponding to Max(8, (the minimum coding block size for the luma component)).

In one embodiment, the bitstream complies with a bitstream conformance requirement that (the maximum picture width*scaling window width of the current picture) to be greater than or equal to ((the current picture width−Max(8, MinCbSizeY))*scaling window width of reference picture in the luma samples).

In one embodiment, the bitstream complies with a bitstream conformance requirement that (the maximum picture height*scaling window height of the current picture) to be greater than or equal to ((the current picture height−Max(8, MinCbSizeY))*scaling window height of reference picture in the luma samples).

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

According to VVC, the derived reference picture scaling ratio (RefPicScale[i][j][0], RefPicScale[i][j][1]) are used for motion compensation. The RefPicScale is derived from the scaling window size/width/height specified in PPS. It affects which filters shall be used in motion compensation stage, and also affects the memory bandwidth used for the motion compensation. For example, for a 16×16 block, when performing the motion compensation, it requires a (16+L−1)× (16+L−1) reference block if the scaling ratio is equal to 1 (e.g. the RefPicScale[i][j][0] and RefPicScale[i][j][1] all equal to 16384), where the L is the filter-tap length of the motion compensation. In SPS, the maximum picture size of the sequence is specified. According to the maximum picture size, the worst case bandwidth can be calculated and constrained. However, when the scaling ratio is equal to 2 (e.g. the RefPicScale[i][j][0] and RefPicScale[i][j][1] all equal to 32768), it requires a (32+L−1)×(32+L−1) reference block. The bandwidth is almost four times when the effect of the filter-tap length is taking into consideration. The required bandwidth is affected by the scaling ratio. For example, if a current picture with size equal to the maximum picture size, and the scaling ratio of one of the reference picture is larger than 1, the required bandwidth of this current picture might be larger than what the system expects. In order to constrain the worst case bandwidth, several methods are proposed.

Method-1: Constraint on the Scaling Ratio

In this invention, the scaling ratio of (the reference picture size to the current picture size) is constrained to be not larger than the ratio of (the maximum picture size in SPS to the current picture size). For example, the scaling_ratio_x*current_picture_width*scaling_ratio_y*current_picture_height shall be smaller than or equal to max_picture_width*max_picture_height. The current_picture_width or height can be the picture width or height (e.g. signaled or derived in PPS), or the conformance window (e.g. signaled or derived in PPS), or the scaling window (e.g. signaled or derived in PPS). The max_picture_width or max_picture_height can be the maximum picture width or height of the current sequence (e.g. signaled or derived in SPS). In one embodiment, the scaling_ratio_x and scaling_ratio_y can be the RefPicIsScaled[ ][ ][0] and RefPicIsScaled[ ][ ][1]. For example, RefPicIsScaled[ ][ ][0] *current_picture_width*RefPicIsScaled[ ][ ][1] *current_picture_height shall be smaller than or equal to max_picture_width*max_picture_height*2^K, or ((RefPicIsScaled[ ][ ][0]*RefPicIsScaled[ ][ ][1] *current_picture_width*current_picture_height)>>K) shall be smaller than or equal to max_picture_width*max_picture_height. K can be 28.

In another embodiment, the horizontal scaling ratio and vertical scaling can be constrained separately. For example, the horizontal and vertical scaling ratio of (the reference picture size to the current picture size) is constrained to be no larger than the ratio of (the maximum picture width in SPS to the current picture width) and the ratio of (the maximum picture height in SPS to the current picture height), respectively. For example, the scaling_ratio_x*current_picture_width shall be smaller than or equal to max_picture_width. The scaling_ratio_y*current_picture_height shall be smaller than or equal to max_picture_height. The current_picture_width or height can be the picture width or height (e.g. signaled or derived in PPS), or the conformance window (e.g. signaled or derived in PPS), or the scaling window (e.g. signaled or derived in PPS). The max_picture_width or max_picture_height can be the maximum picture width or height of the current sequence (e.g. signaled or derived in SPS). In one embodiment, the scaling_ratio_x and scaling_ratio_y can be the RefPicIsScaled[ ][ ][0] and RefPicIsScaled[ ][ ][1]. For example, RefPicIsScaled[ ][ ][0] *current_picture_width shall be smaller than or equal to max_picture_2^K, or ((RefPicIsScaled[ ][ ][0]*current_picture_width)>>K) shall be smaller than or equal to max_picture_width. Similarly, RefPicIsScaled[ ][ ][1]*current_picture_height shall be smaller than or equal to max_picture_height*2^K, or ((RefPicIsScaled[ ][ ][1]*current_picture_height)>>K) shall be smaller than or equal to max_picture_height. K can be 14.

In another embodiment, the size of the scaling window, current picture size, reference picture size, and/or maximum picture size in the current sequence is constrained. For example, let refPicOutputWidthL and refPicOutputHeightL be the PicOutputWidthL and PicOutputHeightL, respectively, of a reference picture of a current picture referring to this PPS. It is a requirement of bitstream conformance that all of the following condition is satisfied:

- refPicOutputWidthL * current_picture_width * refPicOutputHeightL * current_picture_height shall be smaller than or equal to PicOutputWidthL * max_picture_width * PicOutputHeightL * max_picture_height.

In another embodiment, the width and height of the scaling window, the width and height of current picture, the width and height of reference picture, and/or the maximum width and height of picture in the current sequence are constrained separately. For example, let refPicOutputWidthL and refPicOutputHeightL be the PicOutputWidthL and PicOutputHeightL, respectively, of a reference picture of a current picture referring to this PPS. It is a requirement of bitstream conformance that all of the following conditions are satisfied:

- refPicOutputWidthL * current_picture_width shall be smaller than or equal to PicOutputWidthL * max_picture_width,
- refPicOutputHeightL * current_picture_height shall be smaller than or equal to PicOutputHeightL * max_picture_height.

The current_picture_width and current_picture_height can be the picture width and height signaled in SPS or PPS. For example, the picture width and height can be the pic_width_in_luma_samples and pic_height_in_luma_samples, or can be the width and height of conformance cropping window, or can be the width and height of the scaling window.

In another embodiment, the interpolation filter is considered. The worst case MC memory bandwidth of a current picture is equal to CurPicWidth*CurPicHeight*WorstCaseBlockBW/WorstCaseBlockSize. Therefore, if the following condition is satisfied, the worst case MC memory bandwidth is not increased.

CurPicWidth*CurPicHeight*(8*ScalingRatio$X$+7)*
 (8*ScalingRatio$Y$+7)/(8*8)
 <=SpsMaxPicWidth*SpsMaxPicHeight*(8+7)*
 (8+7)/(8*8).

In the above equation, the ScalingRatioX is equal to (refPicOutputWidthL/PicOutputWidthL), the ScalingRatioY is equal to (refPicOutputHeightL/PicOutputHeightL), SpsMaxPicWidth is the maximum picture width signalled in SPS, and SpsMaxPicHeight is the maximum picture height signalled in SPS.

After formula simplification, the above equation can be rewritten as follows.

CurPicWidth*CurPicHeight*(8*refPicOutputWidth$L$+
 7*PicOutputWidth$L$)*(8*refPicOutputHeight$L$+
 7*PicOutputHeight$L$)
 <=*Sps*MaxPicWidth**Sps*MaxPicHeight*225*PicOutputWidth$L$
 *PicOutputHeight$L$.

Similarly, for chroma components, the constraint is as follows.

CurPicWidth*CurPicHeight*(8/
 SubWidth$C$*refPicOutputWidth$L$+3*PicOutputWidth$L$)*(8/
 SubHeight$C$*refPicOutputHeight$L$+
 3*PicOutputHeight$L$)
 <=*Sps*MaxPicWidth**Sps*MaxPicHeight*(8/
 SubWidth$C$+3)*(8/SubHeight$C$+3)
 *PicOutputWidth$L$*PicOutputHeight$L$.

In the above equation, (SubWidthC, SubHeightC) is (2, 2), (2, 1), and (1, 1) for 4:2:0, 4:2:2, and 4:4:4, respectively.

The proposed text for the scaling window sizes is as follows.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidth$L$=pic_width_in_luma_samples−
 (scaling_win_right_offset+scaling_win_left_offset).

PicOutputHeight$L$=pic_height_in_luma_samples−
 (scaling_win_bottom_offset+scaling_win_top_offset).

In another example, the scaling_win_left_offset, scaling_win_right_offset, scaling_win_top_offset, and scaling_win_bottom_offset can be signalled in units of chroma samples. The variables PicOutputWidthL and PicOutputHeightL are derived as follows:

PicOutputWidth$L$=pic_width_in_luma_samples−Sub-
 Width$C$*(scaling_win_right_offset+scaling_win_left_offset).

PicOutputHeight$L$=pic_height_in_luma_samples−
 SubHeight$C$*(scaling_win_bottom_offset+scaling_win_top_offset).

In the above equations, the SubWidthC and SubHeightC specify the sample ratio of luma sample to chroma sample in horizontal and vertical direction, respectively.

According to one embodiment, the following constraints are imposed. When scaling_window_flag is equal to 1, let refPicOutputWidthL and refPicOutputHeightL be the PicOutputWidthL and PicOutputHeightL, respectively, of a reference picture of the current picture referring to this PPS. It is a requirement of bitstream conformance that the following conditions are satisfied:

pic_width_in_luma_samples*pic_height_in_luma_samples*
 (8*refPicOutputWidth$L$+7*PicOutputWidth$L$)*
 (8*refPicOutputHeight$L$+7*PicOutputHeight$L$)
 shall be smaller than or equal to
 pic_width_max_in_luma_samples*pic_height_max_in_luma_
 samples
 height*225*PicOutputWidth$L$*PicOutputHeight$L$.

pic_width_in_luma_samples*pic_height_in_luma_samples*
 (8/SubWidth$C$*refPicOutputWidth$L$+3*PicOutputWidth$L$)*(8/
 SubHeight$C$*refPicOutputHeight$L$+
 3*PicOutputHeight$L$)shall be smaller than or
 equal to
 pic_width_max_in_luma_samples*pic_height_max_in_luma_
 samples height*(8/SubWidth$C$+3)*(8/SubHeight$C$+3)
 *PicOutputWidth$L$*PicOutputHeight$L$.

In another method, we can just take the luma component into account. The proposed text for the scaling window sizes is as follows.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidth$L$=pic_width_in_luma_samples−(scaling_win_right_offset+scaling_win_left_offset).

PicOutputHeight$L$=pic_height_in_luma_samples−(scaling_win_bottom_offset+scaling_win_top_offset).

According to one embodiment, the following constraints are imposed. When scaling_window_flag is equal to 1, let refPicOutputWidthL and refPicOutputHeightL be the PicOutputWidthL and PicOutputHeightL, respectively, of a reference picture of the current picture referring to this PPS. It is a requirement of bitstream conformance that the following condition is satisfied:

pic_width_in_luma_samples*pic_height_in_luma_samples*(8*refPicOutputWidth$L$+7*PicOutputWidth$L$)*(8*refPicOutputHeight$L$+7*PicOutputHeight$L$) shall be smaller than or equal to pic_width_max_in_luma_samples*pic_height_max_in_luma_samples height*225*PicOutputWidth$L$*PicOutputHeight$L$.

Note that, the number of 8, 7, and 3 above can be replaced by other numbers. For example, after formula simplification, it can be rewritten as follows.

CurPicWidth*CurPicHeight*($M$*refPicOutputWidth$L$+$N$*PicOutputWidth$L$)*($O$*refPicOutputHeight$L$+$P$*PicOutputHeight$L$) <=$Sps$MaxPicWidth*$Sps$MaxPicHeight*($M$+$N$)*($O$+$P$)*PicOutputWidth$L$*PicOutputHeight$L$.

Similarly, for chroma components, the constraint is as follows.

CurPicWidth*CurPicHeight*($A$/SubWidth$C$*refPicOutputWidth$L$+$B$*PicOutputWidth$L$)*($C$/SubHeight$C$*refPicOutputHeight$L$+$D$*PicOutputHeight$L$) <=$Sps$MaxPicWidth*$Sps$MaxPicHeight*($A$/SubWidth$C$+$B$)*($C$/SubHeight$C$+$D$) *PicOutputWidth$L$*PicOutputHeight$L$.

In the above equation, (SubWidthC, SubHeightC) is (2, 2), (2, 1), and (1, 1) for 4:2:0, 4:2:2, and 4:4:4, respectively.

In one embodiment, the M and O can be 1, N and P can be 0, A and C can be 1 or 2, B and D can be 0.

In one embodiment, the 16×4 and 4×16 are used as block size to calculate the worst case bandwidth. The constraints can be rewritten as follow.

After formula simplification, it can be rewritten as follows:

CurPicWidth*CurPicHeight*(16*refPicOutputWidth$L$+7*PicOutputWidth$L$)*(4*refPicOutputHeight$L$+7*PicOutputHeight$L$) <=$Sps$MaxPicWidth*$Sps$MaxPicHeight*253*PicOutputWidth$L$ *PicOutputHeight$L$, CurPicWidth*CurPicHeight*(4*refPicOutputWidth$L$+7*PicOutputWidth$L$)*(16*refPicOutputHeight$L$+7*PicOutputHeight$L$) <=$Sps$MaxPicWidth*$Sps$MaxPicHeight*253*PicOutputWidth$L$ *PicOutputHeight$L$.

Similarly, for chroma components, the constraint is as follows:

CurPicWidth*CurPicHeight*(16/SubWidth$C$*refPicOutputWidth$L$+3*PicOutputWidth$L$)*(4/SubHeight$C$*refPicOutputHeight$L$+3*PicOutputHeight$L$) <=$Sps$MaxPicWidth*$Sps$MaxPicHeight*(16/SubWidth$C$+3)*(4/SubHeight$C$+3) *PicOutputWidth$L$*PicOutputHeight$L$, CurPicWidth*CurPicHeight*(4/SubWidth$C$*refPicOutputWidth$L$+3*PicOutputWidth$L$)*(16/SubHeight$C$*refPicOutputHeight$L$+3*PicOutputHeight$L$) <=$Sps$MaxPicWidth*$Sps$MaxPicHeight*(4/SubWidth$C$+3)*(16/SubHeight$C$+3) *PicOutputWidth$L$*PicOutputHeight$L$.

In the above equations, (SubWidthC, SubHeightC) is (2, 2), (2, 1), and (1, 1) for 4:2:0, 4:2:2, and 4:4:4, respectively.

The proposed text for the scaling window sizes is as follows.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidth$L$=pic_width_in_luma_samples−(scaling_win_right_offset+scaling_win_left_offset).

PicOutputHeight$L$=pic_height_in_luma_samples−(scaling_win_bottom_offset+scaling_win_top_offset).

According to one embodiment, the following constraints are imposed. When scaling_window_flag is equal to 1, let refPicOutputWidthL and refPicOutputHeightL be the PicOutputWidthL and PicOutputHeightL, respectively, of a reference picture of the current picture referring to this PPS. It's a requirement of bitstream conformance that the following conditions are satisfied:

pic_width_in_luma_samples*pic_height_in_luma_samples*(16*refPicOutputWidth$L$+7*PicOutputWidthL)*(4*refPicOutputHeight$L$+7*PicOutputHeight$L$) shall be smaller than or equal to pic_width_max_in_luma_samples*pic_height_max_in_luma_samples height*253*PicOutputWidth$L$*PicOutputHeight$L$.

pic_width_in_luma_samples*pic_height_in_luma_samples*(4*refPicOutputWidth$L$+7*PicOutputWidth$L$)*(16*refPicOutputHeight$L$+7*PicOutputHeight$L$) shall be smaller than or equal to pic_width_max_in_luma_samples*pic_height_max_in_luma_samples height*253*PicOutputWidth$L$*PicOutputHeight$L$.

pic_width_in_luma_samples*pic_height_in_luma_samples*(16/SubWidth$C$*refPicOutputWidth$L$+3*PicOutputWidth$L$)*(4/SubHeight$C$*refPicOutputHeight$L$+3*PicOutputHeight$L$)shall be smaller than or equal to pic_width_max_in_luma_samples*pic_height_max_in_luma_samples height*(16/SubWidth$C$+3)*(4/SubHeight$C$+3) *PicOutputWidth$L$*PicOutputHeight$L$.

pic_width_in_luma_samples*pic_height_in_luma_samples*(4/SubWidth$C$*refPicOutputWidth$L$+3*PicOutputWidth$L$)*(16/SubHeight$C$*refPicOutputHeight$L$+3*PicOutputHeight$L$)shall be smaller than or equal to pic_width_max_in_luma_samples*pic_height_max_in_luma_samples height*(4/SubWidth$C$+3)*(16/SubHeight$C$+3)
*PicOutputWidth$L$*PicOutputHeight$L$.

Also, in another example, we can just take the luma component into account.

In another embodiment, a tolerance ratio can be invoked. For example, the Ty can be the tolerance value for luma. The Tc can be the tolerance value for chroma. Ty and Tc can be integer or a real number (e.g. 1.0, 1.2, 1.1, 1.5, etc.).

For example after formula simplification, the constraint can be rewritten as follows.

CurPicWidth*CurPicHeight*
($M$*refPicOutputWidth$L$+$N$*PicOutputWidth$L$)*
($O$*refPicOutputHeight$L$+$P$*PicOutputHeight$L$)
<=$Sps$MaxPicWidth*$Sps$MaxPicHeight*($M$+$N$)*
($O$+$P$)*PicOutputWidth$L$*PicOutputHeight$L$*$Ty$.

Similarly, for chroma components, the constraint is as follows.

CurPicWidth*CurPicHeight*($A$/
SubWidth$C$*refPicOutputWidth$L$+
$B$*PicOutputWidth$L$)*($C$/
SubHeight$C$*refPicOutputHeight$L$+
$D$*PicOutputHeight$L$)
<=$Sps$MaxPicWidth*$Sps$MaxPicHeight*($A$/
SubWidth$C$+$B$)*($C$/SubHeight$C$+$D$)
*PicOutputWidth$L$*PicOutputHeight$L$*$Tc$, In the above equation, (SubWidthC, SubHeightC) is (2, 2), (2, 1), and (1, 1) for 4:2:0, 4:2:2, and 4:4:4, respectively.

In one example, the M and O can be 1, N and P can be 0, A and C can be 1 or 2, B and D can be 0. In one example, the M and O can be 8, N and P can be 7 or 8, A and C can be 8, B and D can be 3 or 4. In one example, the M can be 16 O can be 4, N and P can be 7 or 8, A can be 16 and C can be 4, B and D can be 3 or 4. In one example, the M can be 4 O can be 16, N and P can be 7 or 8, A can be 4 and C can be 16, B and D can be 3 or 4.

In another embodiment, the vertical and horizontal direction constraints can be separated. For example, after formula simplification, the constraints can be rewritten as follows.

CurPicWidth*($M$*refPicOutputWidth$L$+
$N$*PicOutputWidth$L$)<=$Sps$MaxPicWidth*($M$+
$N$)*PicOutputWidth$L$*$Ty$_$x$.

CurPicHeight*($O$*refPicOutputHeight$L$+
$P$*PicOutputHeight$L$)<=$Sps$MaxPicHeight*($O$+
$P$)*PicOutputHeight$L$*$Ty$_$y$.

Similarly, for chroma components, the constraints are as follows.

CurPicWidth*($A$/SubWidth$C$*refPicOutputWidth$L$+
$B$*PicOutputWidth$L$)<=$Sps$MaxPicWidth*($A$/
SubWidth$C$+$B$)*PicOutputWidth$L$*$Tc$_$x$.

CurPicHeight*($C$/SubHeight$C$*refPicOutputHeight$L$+
$D$*PicOutputHeight$L$)<=$Sps$MaxPicHeight*($C$/
SubHeight$C$+$D$)*PicOutputHeight$L$*$Tc$_$y$.

In the above equations, (SubWidthC, SubHeightC) is (2, 2), (2, 1), and (1, 1) for 4:2:0, 4:2:2, and 4:4:4, respectively.

In one example, after formula simplification, the constraints can be rewritten as follows.

CurPicWidth*(16*refPicOutputWidth$L$+7*PicOutputWidth$L$)<=$Sps$MaxPicWidth*(16+7)
*PicOutputWidth$L$*$Ty$_$x$.

CurPicHeight*(4*refPicOutputHeight$L$+7*PicOutputHeight$L$)<=$Sps$MaxPicHeight*(4+7)
*PicOutputHeight$L$*$Ty$_$y$.

CurPicWidth*(4*refPicOutputWidth$L$+7*PicOutputWidth$L$)<=$Sps$MaxPicWidth*(4+7)
*PicOutputWidth$L$*$Ty$_$x$.

CurPicHeight*(16*refPicOutputHeight$L$+7*PicOutputHeight$L$)<=$Sps$MaxPicHeight*(16+7)
*PicOutputHeight$L$*$Ty$_$y$.

In another example, the constraints can be rewritten as follows:

CurPicWidth*(4*refPicOutputWidth$L$+7*PicOutputWidth$L$)<=$Sps$MaxPicWidth*(4+7)
*PicOutputWidth$L$*$Ty$_$x$.

CurPicHeight*(4*refPicOutputHeight$L$+7*PicOutputHeight$L$)<=$Sps$MaxPicHeight*(4+7)
*PicOutputHeight$L$*$Ty$_$y$.

In another example, the constraints can be rewritten as follows:

CurPicWidth*(16*refPicOutputWidth$L$+7*PicOutputWidth$L$)<=$Sps$MaxPicWidth*(16+7)
*PicOutputWidth$L$*$Ty$_$x$.

CurPicHeight*(16*refPicOutputHeight$L$+7*PicOutputHeight$L$)<=$Sps$MaxPicHeight*(16+7)
*PicOutputHeight$L$*$Ty$_$y$.

Similarly, for chroma components, the constraints are as follows:

CurPicWidth*(16/SubWidth$C$*refPicOutputWidth$L$+
3*PicOutputWidth$L$)<=$Sps$MaxPicWidth*(16/
SubWidth$C$+3)*PicOutputWidth$L$*$Tc$_$x$.

CurPicHeight*(4/SubHeight$C$*refPicOutputHeight$L$+
3*PicOutputHeight$L$)<=$Sps$MaxPicHeight*(4/
SubHeight$C$+3)*PicOutputHeight$L$*$Tc$_$y$.

CurPicWidth*(4/SubWidth$C$*refPicOutputWidth$L$+
3*PicOutputWidth$L$)<=$Sps$MaxPicWidth*(4/
SubWidth$C$+3)*PicOutputWidth$L$*$Tc$_$x$.

CurPicHeight*(16/
SubHeight$C$*refPicOutputHeight$L$+3*PicOutputHeight$L$)<=$Sps$MaxPicHeight*(16/SubHeight$C$+3)*PicOutputHeight$L$*$Tc$_$y$.

In another example, the constraints can be rewritten as follows:

CurPicWidth*(4/SubWidth$C$*refPicOutputWidth$L$+
3*PicOutputWidth$L$)<=$Sps$MaxPicWidth*(4/
SubWidth$C$+3)*PicOutputWidth$L$*$Tc$_$x$.

CurPicHeight*(4/SubHeight$C$*refPicOutputHeight$L$+
3*PicOutputHeight$L$)<=$Sps$MaxPicHeight*(4/
SubHeight$C$+3)*PicOutputHeight$L$*$Tc$_$y$.

In another example, the constraints can be rewritten as follows:

CurPicWidth*(16/SubWidth$C$*refPicOutputWidth$L$+
3*PicOutputWidth$L$)<=$Sps$MaxPicWidth*(16/
SubWidth$C$+3)*PicOutputWidth$L$*$Tc$_$x$.

CurPicHeight*(16/
SubHeight$C$*refPicOutputHeight$L$+3*PicOutputHeight$L$)<=$Sps$MaxPicHeight*(16/SubHeight$C$+3)*PicOutputHeight$L$*$Tc$_$y$.

In the above equations, (SubWidthC, SubHeightC) is (2, 2), (2, 1), and (1, 1) for 4:2:0, 4:2:2, and 4:4:4, respectively.

In another embodiment, the filter tap length can be ignored. For example, after formula simplification, the constraint can be rewritten as follows:

$$\text{CurPicWidth} * \text{CurPicHeight} * \text{refPicOutputWidth}L \\ * \text{refPicOutputHeight}L <= Sps\text{MaxPicWidth} * Sps\text{MaxPicHeight} \\ * \text{PicOutputWidth}L * \text{PicOutputHeight}L * T.$$

In another example, the constraints can be rewritten as follows:

$$\text{CurPicWidth} * \text{refPicOutputWidth}L <= Sps\text{MaxPicWidth} \\ * \text{PicOutputWidth}L * Tx.$$

$$\text{CurPicHeight} * \text{refPicOutputHeight}L <= Sps\text{MaxPicHeight} \\ * \text{PicOutputHeight}L * Ty.$$

However, in the case of reference picture is full-HD (e.g. 1920×1080) and the current picture is quarter-size of full-HD (e.g. 960×544), the scaling window of reference picture is 1920×1080 and the scaling window of the current picture if 960×540, the height constraint is not satisfied. Therefore, the constraint should be loosed a little bit. In one embodiment, current picture width or height is subtracted by a term. For example, the term can be 8, 16, a positive integer, a value related to minCbSizeY or minCbSizeC, a value related to CTU/CU constraint, or can be Max(8, MinCbSizeY), or Max(k, MinCbSizeY) where k is a positive integer. For example, the constraints can be modified as follow:

$$(\text{pic\_width\_in\_luma\_samples} - \text{Max}(8, \text{Min}Cb\text{Size}Y)) \\ * \text{refPicOutputWidth}L \text{ shall be smaller than or} \\ \text{equal to pic\_width\_max\_in\_luma} \\ \text{samples} * \text{PicOutputWidth}L.$$

$$(\text{pic\_height\_in\_luma\_samples} - \text{Max}(8, \text{Min}Cb\text{Size}Y)) \\ * \text{refPicOutputHeight}L \text{ shall be smaller than or} \\ \text{equal to} \\ \text{pic\_height\_max\_in\_luma\_samples} * \text{PicOutputHeight}L.$$

Or $$\text{PicOutputWidth}L * \text{pic\_width\_max\_in\_luma\_samples} \\ \text{is greater than or equal to refPicOutputWidth}L * \\ (\text{pic\_width\_in\_luma\_samples} - \text{Max}(8, \text{Min}Cb\text{Size}Y)).$$

$$\text{PicOutputHeight}L * \text{pic\_height\_max\_in\_luma\_samples} \\ \text{is greater than or equal to refPicOutputHeight}L * (\text{pic\_height\_in\_luma\_samples} - \text{Max} \\ (8, \text{Min}Cb\text{Size}Y)).$$

In another example, the constraints can be rewritten as follows:

$$(\text{CurPicWidth} - \text{Max}(8, \text{Min}Cb\text{Size}Y)) \\ * \text{refPicOutputWidth}L <= Sps\text{MaxPicWidth} * \text{PicOutputWidth}L.$$

$$(\text{CurPicHeight} - \text{Max}(8, \text{Min}Cb\text{Size}Y)) \\ * \text{refPicOutputHeight}L <= Sps\text{MaxPicHeight} * \text{PicOutputHeight}L.$$

In yet another example, the constraints can be rewritten as follows:

$$(\text{CurPicWidth} - \text{Max}(8, \text{Min}Cb\text{Size}Y)) \\ * \text{refPicOutputWidth}L <= Sps\text{MaxPicWidth} \\ * \text{PicOutputWidth}L * Tx.$$

$$(\text{CurPicHeight} - \text{Max}(8, \text{Min}Cb\text{Size}Y)) \\ * \text{refPicOutputHeight}L <= Sps\text{MaxPicHeight} \\ * \text{PicOutputHeight}L * Ty.$$

In yet another example, the constraint can be rewritten as follows:

$$(\text{CurPicWidth} - \text{Max}(8, \text{Min}Cb\text{Size}Y)) * (\text{CurPicHeight} - \\ \text{Max}(8, \text{Min}Cb\text{Size}Y)) \\ * \text{refPicOutputWidth}L * \text{refPicOutputHeight}L <= \\ Sps\text{MaxPicWidth} * \text{PicOutputWidth}L * Sps\text{MaxPicHeight} \\ * \text{PicOutputHeight}L.$$

In yet another example, the constraint can be rewritten as follows:

$$(\text{CurPicWidth} - \text{Max}(8, \text{Min}Cb\text{Size}Y)) * (\text{CurPicHeight} - \\ \text{Max}(8, \text{Min}Cb\text{Size}Y)) \\ * \text{refPicOutputWidth}L * \text{refPicOutputHeight}L <= Sps\text{MaxPicWidth} \\ * \text{PicOutputWidth}L * Sps\text{MaxPicHeight} * \text{PicOutputHeight}L * T.$$

In another embodiment, the max picture width or height can be added by a term. For example, the term can be 8, 16, a positive integer, a value related to minCbSizeY/C, a value related to CTU/CU constraint, or can be Max(8, MinCbSizeY), or Max(k, MinCbSizeY) where k is a positive integer. For example, the constraints can be modified as follow:

$$\text{pic\_width\_in\_luma\_samples} * \text{refPicOutputWidth}L \\ \text{shall be smaller than or equal to} \\ (\text{pic\_width\_in\_luma\_samples} + \text{Max}(8, \text{Min}Cb\text{Size}Y)) * \text{PicOutputWidth}L.$$

$$\text{pic\_height\_in\_luma\_samples} * \text{refPicOutputHeight}L \\ \text{shall be smaller than or equal to} \\ (\text{pic\_height\_max\_in\_luma\_samples} + \text{Max}(8, \\ \text{Min}Cb\text{Size}Y)) * \text{PicOutputHeight}L.$$

In yet another example, the constraints can be rewritten as follows:

$$\text{CurPicWidth} * \text{refPicOutputWidth}L <= (Sps\text{-} \\ \text{MaxPicWidth} + \text{Max}(8, \text{Min}Cb\text{Size}Y)) * \text{PicOutputWidth}L.$$

$$\text{CurPicHeight} * \text{refPicOutputHeight}L <= (Sps\text{-} \\ \text{MaxPicHeight} + \text{Max}(8, \text{Min}Cb\text{Size}Y)) * \text{PicOutputHeight}L.$$

In yet another example, the constraints can be rewritten as follows:

$$\text{CurPicWidth} * \text{refPicOutputWidth}L <= (Sps\text{-} \\ \text{MaxPicWidth} + \text{Max}(8, \text{Min}Cb\text{Size}Y)) \\ * \text{PicOutputWidth}L * Tx.$$

$$\text{CurPicHeight} * \text{refPicOutputHeight}L <= (Sps\text{-} \\ \text{MaxPicHeight} + \text{Max}(8, \text{Min}Cb\text{Size}Y)) \\ * \text{PicOutputHeight}L * Ty.$$

In yet another example, the constraint can be rewritten as follows:

$$\text{CurPicWidth} * \text{CurPicHeight} * \text{refPicOutputWidth}L \\ * \text{refPicOutputHeight}L <= (Sps\text{MaxPicWidth} + \text{Max} \\ (8, \text{Min}Cb\text{Size}Y)) * \text{PicOutputWidth}L * (Sps\text{-} \\ \text{MaxPicHeight} + \text{Max}(8, \text{Min}Cb\text{Size}Y)) * \text{PicOutputHeight}L.$$

In yet another example, the constraint can be rewritten as follows:

$$\text{CurPicWidth} * \text{CurPicHeight} * \text{refPicOutputWidth}L \\ * \text{refPicOutputHeight}L <= (Sps\text{MaxPicWidth} + \text{Max} \\ (8, \text{Min}Cb\text{Size}Y)) * \text{PicOutputWidth}L * (Sps\text{-} \\ \text{MaxPicHeight} + \text{Max}(8, \text{Min}Cb\text{Size}Y)) \\ * \text{PicOutputHeight}L * T.$$

In another embodiment, both the current picture width or height can be subtracted by a term and the max picture width or height can be added by a term as above mentioned.

In another embodiment, in the above mentioned method, the picture or scaling window width or height can be replaced by number of CTU in picture/scaling window width/height.

Method-2: Disabling Small Inter Block when the Scaling Ratio is Larger than a Threshold.

For motion compensation, because of the effect of interpolation filter, the smaller block requires larger bandwidth per sample. To reduce the memory bandwidth, it is proposed to disable the small inter blocks when the scaling ratio is larger than a threshold. For example, when the scaling ratio is larger than K, or larger than or equal to K, the inter blocks with height and/or height smaller than N are disabled. In another example, when the scaling ratio is larger than K, the inter blocks with area smaller than M are disabled. K can be 1, 1.25, 1.5, 1.75, or 2.0. N can be 8, 16, or 32. M can be 32, 64, 128, 256, 512, or 1024.

In one embodiment, the RefPicIsScaled[ ][ ][0] and/or RefPicIsScaled[ ][ ][1] can be used. For example, when the RefPicIsScaled[ ][ ][0] and/or RefPicIsScaled[ ][ ][1] is larger than K or larger than or equal to K, the inter blocks with height and/or height smaller than N are disabled. In another example, when the RefPicIsScaled[ ][ ][0] and/or RefPicIsScaled[ ][ ][1] is larger than K, the inter blocks with area smaller than M are disabled. K can be (1, 1.25, 1.5, 1.75, or 2.0)*2^P, where P can be 14. N can be 8, 16, or 32. M can be 32, 64, 128, 256, 512, or 1024.

Method-3: No Inter Prediction Outside the Current Scaling Window

In the proposed method, if the current CU is outside the current picture scaling window, the encoder should not use inter mode for this CU. Therefore, the bitstream should have the conformance that the CU outside the scaling window should all not be inter mode. In another embodiment, the related syntax can be saved. For example, any CU outside the scaling window will only need to send syntax related to intra mode so that all inter mode related syntax can be saved. This method will also guarantee the worst case bandwidth.

In the methods disclosed above, the constraints on scaling for RPR are illustrated in various equations or formulas. These equations or formulas are not intended to provide an exhaustive list of possible implementation based on embodiments of the present invention. As known in the field, these equations or formulas may have various forms by rearranging or regrouping the terms in these equations or formulas. The embodiments of the present invention cover all equivalent equations or formulas.

Any of the foregoing proposed methods can be implemented in encoders and/or decoders. For example, any of the proposed methods can be implemented in a scaling or motion compensation module or parameter determining module of an encoder, and/or a scaling or motion compensation module or parameter determining module of a decoder. Alternatively, any of the proposed methods can be implemented as one or more circuits coupled to the scaling or motion compensation module or parameter determining module of the encoder and/or the scaling or motion compensation module or parameter determining module decoder, so as to provide the information needed by the scaling or motion compensation module or parameter determining module.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 2:
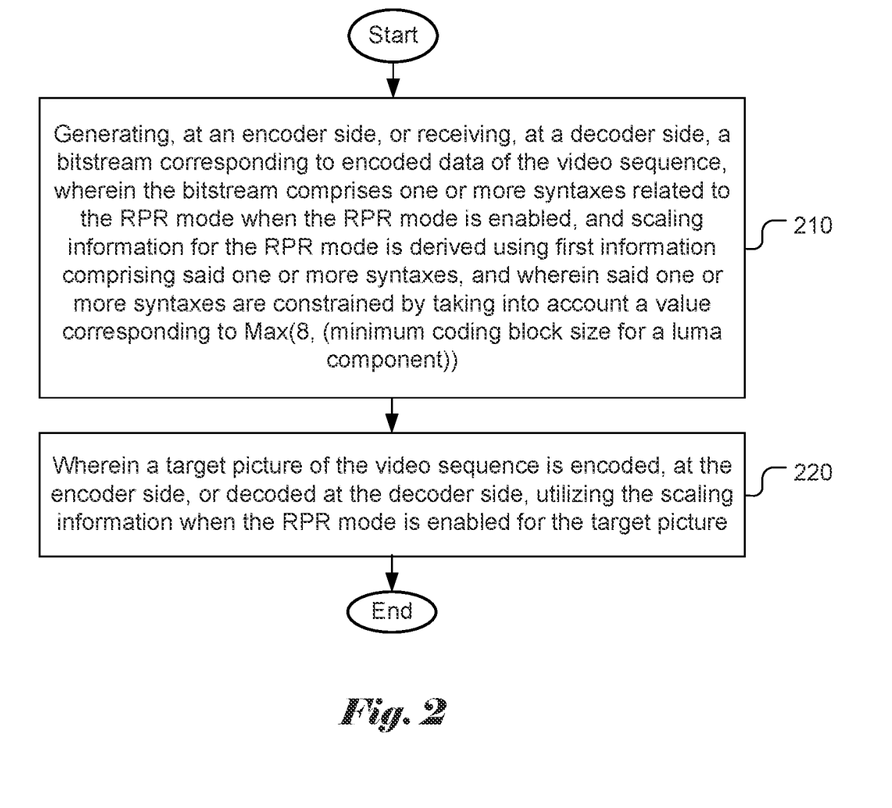
FIG. 2 illustrates an exemplary flow diagram of a method incorporating constrained Reference Picture Resampling (RPR) parameters according to an embodiment of the present invention.

FIG. 2 illustrates an exemplary flow diagram of a method incorporating constrained Reference Picture Resampling (RPR) parameters according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to the method, a bitstream corresponding to encoded data of the video sequence is generated at an encoder side or received at a decoder side in step 210, wherein the bitstream comprises one or more syntaxes related to the RPR mode when the RPR mode is enabled, and scaling information for the RPR mode is derived using first information comprising said one or more syntaxes, and wherein said one or more syntaxes are constrained by taking into account a value corresponding to Max(8, (minimum coding block size for a luma component)). A target picture of the video sequence is encoded, at the encoder side, or decoded at the decoder side, utilizing the scaling information when the RPR mode is enabled for the target picture in step 220.

The flowchart shown above is intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for coding a video sequence, wherein a Reference Picture Resampling (RPR) mode is supported, the method comprising:

generating, at an encoder side, or receiving, at a decoder side, a bitstream corresponding to encoded data of the video sequence, wherein the bitstream comprises one or more syntaxes related to the RPR mode when the RPR mode is enabled, and scaling information for the RPR mode is derived using said one or more syntaxes, and wherein said one or more syntaxes are constrained by taking into account a value corresponding to Max(8, (minimum coding block size for a luma component));

wherein the minimum coding block size for the luma component is indicated by one variable, MinCbSizeY, wherein said one or more syntaxes comprise a first syntax corresponding to current picture width in luma samples and a second syntax corresponding to maximum picture width in the luma samples, wherein said one or more syntaxes are constrained to cause ((the current picture width−Max(8, MinCbSizeY))*scaling window width of reference picture in the luma samples) to be smaller than or equal to (the maximum picture width*scaling window width of a current picture), and wherein a target picture of the video sequence is encoded, at the encoder side, or decoded at the decoder side, utilizing the scaling information.

2. The method of claim 1, wherein said one or more syntaxes comprise a third syntax corresponding to current picture height in luma samples and a fourth syntax corresponding to maximum picture height in the luma samples.

3. The method of claim 2, wherein said one or more syntaxes are constrained to cause ((the current picture height−Max(8, MinCbSizeY))*scaling window height of reference picture in the luma samples) to be smaller than or equal to (the maximum picture height*scaling window height of current picture).

4. The method of claim 1, wherein the bitstream complies with a bitstream conformance requirement that said one or more syntaxes are constrained by disregarding interpolation filter for motion compensation, and said one or more syntaxes are constrained by taking into account the value corresponding to Max(8, (the minimum coding block size for the luma component)).

5. The method of claim 1, wherein the bitstream complies with a bitstream conformance requirement that (maximum picture width*scaling window width of current picture) to be greater than or equal to ((current picture width−Max(8, MinCbSizeY))*scaling window width of reference picture in luma samples).

6. The method of claim 1, wherein the bitstream complies with a bitstream conformance requirement that (maximum picture height*scaling window height of current picture) to be greater than or equal to ((current picture height−Max(8, MinCbSizeY))*scaling window height of reference picture in luma samples).

7. An apparatus for coding a video sequence, wherein a Reference Picture Resampling (RPR) mode is supported, the apparatus comprising one or more electronic circuits or processors arranged to:

generate, at an encoder side, or receive, at a decoder side, a bitstream corresponding to encoded data of the video sequence, wherein the bitstream comprises one or more syntaxes related to the RPR mode when the RPR mode is enabled, and scaling information for the RPR mode is derived using said one or more syntaxes, and wherein said one or more syntaxes are constrained by taking into account a value corresponding to Max(8, (minimum coding block size for a luma component));

wherein the minimum coding block size for the luma component is indicated by one variable, MinCbSizeY, wherein said one or more syntaxes comprise a first syntax corresponding to current picture width in luma samples and a second syntax corresponding to maximum picture width in the luma samples, wherein said one or more syntaxes are constrained to cause ((the current picture width−Max(8, MinCbSizeY))*scaling window width of reference picture in the luma samples) to be smaller than or equal to (the maximum picture width*scaling window width of a current picture), and wherein a target picture of the video sequence is encoded, at the encoder side, or decoded at the decoder side, utilizing the scaling information.

8. The apparatus of claim 7, wherein said one or more syntaxes comprise a third syntax corresponding to current picture height in luma samples and a fourth syntax corresponding to maximum picture height in the luma samples.

9. The apparatus of claim 8, wherein said one or more syntaxes are constrained to cause ((the current picture height−Max(8, MinCbSizeY))*scaling window height of reference picture in the luma samples) to be smaller than or equal to (the maximum picture height*scaling window height of current picture).

10. The apparatus of claim 7, wherein the bitstream complies with a bitstream conformance requirement that said one or more syntaxes are constrained by disregarding interpolation filter for motion compensation, and said one or more syntaxes are constrained by taking into account the value corresponding to Max(8, (the minimum coding block size for the luma component)).

11. The apparatus of claim 7, wherein the bitstream complies with a bitstream conformance requirement that (maximum picture width*scaling window width of current picture) to be greater than or equal to ((current picture width−Max(8, MinCbSizeY))*scaling window width of reference picture in luma samples).

12. The apparatus of claim 7, wherein the bitstream complies with a bitstream conformance requirement that (maximum picture height*scaling window height of current picture) to be greater than or equal to ((current picture height−Max(8, MinCbSizeY))*scaling window height of reference picture in luma samples).

* * * * *